United States Patent Office 3,578,647
Patented May 11, 1971

3,578,647
CHEMICAL CROSSLINKING SCORCH PREVENT-
ING ADDITIVES AND PROCESS THEREFOR
Razmic S. Gregorian, Silver Spring, and Charles C. Kirk,
Laurel, Md., assignors to W. R. Grace & Co., New
York, N.Y.
No Drawing. Filed May 6, 1968, Ser. No. 727,008
Int. Cl. C08f 27/00
U.S. Cl. 260—86.7                                    4 Claims

ABSTRACT OF THE DISCLOSURE

This invention relates to the prevention of scorch in a process for chemically crosslinking ethylene-containing homopolymers and copolymers by free radical generating crosslinking agents by the addition of chain transfer agents to the system.

Polymers of ethylene such as those described in U.S. 2,153,553 and in U.S. 2,816,883 as well as ethylene copolymers with other vinyl and olefinic monomers wherein at least 30% of the copolymer is ethylene are well known in the art today and are generally characterized by their organic solvent solubility and their thermoplastic properties. Several methods have been tried with varying success to decrease thermoplasticity and solubility of the aforesaid polymers and copolymers by crosslinking same. Such methods include electron impingement of the polymeric material and blending of free radical liberating substances into the polymer. In regard to the aforesaid latter method of polymer crosslinking by chemical means, the main class of free radical generating crosslinking agents which have been used to date are organic peroxides, azides and azo compounds. For the most part organic peroxides have been the most successful due to their wider range of decomposition temperatures. However, even the organic peroxides, which cause crosslinking upon admixture with the aforesaid polymeric materials, have been found lacking in certain regards. For example, it is known that in commercial practice, the crosslinking agent usually employed is selected on the basis that its decomposition temperature is as near as possible but slightly in excess of the melting point of the polymeric material. This decreases the cost of heating the polymer to elevated temperatures to effect curing after the polymer is shaped by various known means, e.g. extrusion. For low density polyethylene having a melting point in the range 90–110° C. and ordinarily processed at temperatures in the range 125–170° C., various peroxidic and azo compounds are operable to cause crosslinking in the polymer subsequent to processing. However, with the advent of high density polyethylene having a melting point in the range 135–140° C., the chemical crosslinking agents available to give efficient crosslinking decreases appreciably. Thus, there is today only one or two known peroxide crosslinking agents on the market which can be used to crosslink high density polyethylene and even these cause scorching (premature crosslinking) to some extent at ordinary processing temperatures for high density polyethylene in the range of 150–250° C. Scorching of the polymer in a processing operation is to be avoided at all cost since it necessitates costly shutdowns to clean out the extruder or other mechanism employed to shape the polymer.

One object of the instant invention is to preclude or curtail scorching of ethylene-containing homopolymers and copolymers in normal processing operations. Another object of the instant invention is to preclude scorching of ethylene-containing homopolymers and copolymers in normal processing operations and still obtain a product with sufficient gel content as to yield a three dimensional network.

Surprisingly, it has now been found that scorching can be prevented or appreciably curtailed in the chemical crosslinking of ethylene-containing homopolymers and copolymers which are being subjected to crosslinking by free radical generating crosslinking agents by the addition of a chain transfer agent to the system prior to processing the polymeric material into its desired shape.

Various chain transfer agents are operable in the instant invention and lists of same, incorporated herein by reference, are provided in George E. Ham, Vinyl Polymerization, vol. I, pp. 52–55, 171–175 and 236–247, Marcel Decker, Inc., New York 1967. Among the more efficient are the mercaptans, halogenated compounds, multi-ring aromatics, hydrogen sulfide, phenols and compounds containing allylic hydrogen. Examples of some of the most efficient chain transfer agents include, but are not limited to, hydrogen sulfide, methyl mercaptan, styrene dibromide, carbon tetrabromide, iodoacetic acid, chloroacetyl, chloride, acetyl bromide, diethyl dibromomalonate, pentaphenyleneethane, isopropyl mercaptan, n-butyl mercaptan, tert-butyl mercaptan, n-amyl mercaptan, thiophenol, 2-hydroxyethyl mercaptan, carbethoxymethyl mercaptan, dipentene, 9-phenyl fluorene, fluorene, naphthalene, phenanthrene, 1,1 - dibromoethane pentachloroethane, hexachloroethane, 1,1,2,2 - tetrabromoethane, trichloroethylene, tetrabromoethylene, allyl chloride, n-butylbromide, methyl iodide, monochloroacetic acid, monobromoacetic acid, trichloroacetic acid, chloral hydrate, chloral, furfuryl alcohol, propionaldehyde, n-butyraldehyde, crotonaldehyde, dimedone, furfural, ethyltrichloro acetate, diethyldithio glycolate, methyl oleate, methyl cyanoacetate, triethylamine, nitromethane, benzyl cyanide, di-n-butyl disulfide, diacetyl disulfide, benzyl mercaptan, allyl nitrile, allyl alcohol, phenol, resorcinol, hydroquinone, 3-methylbutene-1 and the like.

The amount of chain transfer agent employed can vary over wide limits. For example, if the chain transfer agent is volatile at the processing temperature, the amount of chain transfer agent present is not critical since any excess present will volatilize after leaving the extruder or other processing mechanism. If the chain transfer agent is not volatile at the processing temperature the amount used is dependent upon the half-life of the crosslinking agent at the processing temperature. That is, for example, the shorter the half-life of the crosslinking agent and the longer the residence time in the processing mechanism, the greater the amount of chain transfer agent needed to prevent scorching. In commercial practice, one usually choses a free radical generating crosslinking agent so that not more than one-half life is used during its time in the processing mechanism, e.g., extruder. Based on this, the amount of chain transfer agent employed in the instant invention is an amount sufficient to react stoichiometrically with 5–50% of the free radical generating crosslinking agent added to the polymer.

The addition of chain transfer agents to chemical crosslinking systems of ethylene-containing homopolymers and copolymers allows one to employ higher extrusion temperatures and longer operating times at these temperatures than is normally possible in their absence.

Although all the various polymeric materials, free radical generating crosslinking agents, and chain transfer agents mentioned herein are operable in the instant invention, the invention for the most part will be discussed using low density polyethylene in combination with an organic peroxide as the crosslinking agent and hydrogen sulfide as the chain transfer agent.

The following examples are set down to illustrate the invention and are not to be deemed as limiting its scope.

Throughout the instant invention the melt indices (MI) were measured under the conditions specified in ASTM D 1238–52T. The densities of the polymeric material were measured under the conditions specified in ASTM D 1505–57T. The percent gel of the polymeric material in the instant invention was measured by refluxing a weighed sample (approximately 0.5 g.) of polymeric material in a cellulose Soxhlet thimble in toluene (containing 0.3 weight percent 2,6-ditertiary-butyl-4-methyl-phenol, a commercially available antioxidant sold under the trade name "Ionol" by Shell Oil Company) for 24 hours. The insoluble portion of the polymer sample after drying was weighed to calculate percent gel as follows:

$$\text{Percent gel} = \frac{\text{weight insoluble sample}}{\text{total weight of sample}} \times 100$$

In all examples the extruder employed was a 1" NMR extruder having an $L/D$ ratio of 17/1. An elbow tube die was usually employed to extrude a 1" diameter tube having a thickness of approximately 20 mils.

Unless otherwise noted all parts and percentages are by weight.

EXAMPLE 1

A commercially available polyethylene having a density of 0.92 and a melt index of 2.0, available from E. I. du Pont & Co. under the trade name "Alathon 14" in pellet form was coated with 0.50 percent by weight of 2,5-dimethyl-2,5-di(t-butylperoxy)hexyne-3 sold under the trade name "Lupersol 130" by Wallace & Tiernan Inc. and extruded from a 1" NRM extruder in the form of a 1" diameter tube having a wall thickness of 20 mils at a die temperature of 295–300° F. The extruded polymer in the form of the tube cured to a gel content of 45% by passing it through a vertical oven at approximately 800° F. for about 1 minute residence time. Gel formation was noted in the tube exiting the die prior to passage through the oven as specks in the extruded tube appeared after 23 minutes of extrusion running time. 0.007 percent by weight $H_2S$ was added to the polymer crosslinking agent admixture prior to extrusion and extrusion was continued. The thus extruded tube containing the chain transfer agent had a gel content of 43% and the extrusion time was extended to forty minutes before the appearance of gel specks in the extruded tube exiting the die prior to passage through the oven.

The addition of 0.2 percent by weight $H_2S$ to the same system produced a cured tube with a gel content of 26% and there was no evidence of gel specks after 50 minutes of extrusion.

The addition of 0.2 percent by weight methyl mercaptan to the same system produced a cured tube with a gel content in excess of 25% and the extrusion time was extended to more than 55 minutes without the appearance of gel specks in the tube exiting the die.

EXAMPLE 2

0.5 percent by weight "Lupersol 130" was added to "Alathon 14" polyethylene and extruded through the 1" NRM extruder at a die temperature of 305° F. The thus extruded tube had a gel content of 43%. Within 19 minutes gel specks appeared in the tube on its exit from the extruder die. The addition of 0.07 percent by weight $H_2S$ to the polymer-crosslinking agent mixture prior to extrusion resulted in a cured tube having a gel content of 42% under the same conditions. No gel specks were noted after 32 minutes of extrusion.

The example was repeated except that 0.014 percent by weight $H_2S$ was added to the polymer-crosslinking agent mixture prior to extrusion. The cured tube had a gel content of 42% and no gel specks were noted in the tube exiting the die after 70 minutes.

EXAMPLE 3

0.5 percent by weight of "Lupersol 130" was admixed with "Alathon 14" polyethylene and the admixture was extruded from the 1" NRM extruder at a die temperature of 320° F. The tube after passing through the vertical oven at 800° F. (1 minute residence time) had a gel content of 43%. After 15 minutes gel specks were noted in the tube exiting from the extruder die.

0.07 percent by weight $H_2S$ was added to the polymer-crosslinking agent mixture prior to extrusion and extrusion was continued. The thus extruded tube after passing through the vertical oven at 800° F. had a gel content of 38%. No gel specks were noted in the tube after 24 minutes of extrusion.

EXAMPLE 4

"Alathon 14" polyethylene pellets were coated with 0.30 percent by weight "Lupersol 130" and 0.10 percent by weight p-divinyl benzene (additional crosslinking agent) and extruded in the form of a ½" diameter tube (20 mil thickness) at a die temperature of 285° F. The tube produced was cured by passing through a furnace at 900° F. (1 minute residence) to obtain a gel content of 56%. Extrusion of this material for 35 minutes left an accumulation of gel in the extruder.

0.005 percent by weight $H_2S$ was added to the polymer mixture prior to extrusion resulting in the tube having a gel content of 53% subsequent to passing through the vertical oven at 900° F. There was no gel accumulation in the extruder after 35 minutes extrusion at the same temperatures.

The amount of free radical generating crosslinking agent added to crosslink the ethylene-containing homopolymers and copolymers of the instant invention is relatively minor. Amounts in the range 0.001 to 10% based on the weight of the polymer is operable. The preferable range is 0.001 to 3% based on the weight of the polymer.

It should be understood that the free radical generating crosslinking agent and the chain transfer agent can be added to the polymer and blended therewith at temperatures below the softening point of the polymer. It is also possible to blend the free radical generating crosslinking agent and/or the chain transfer agent with a solvent and admix it with the polymeric material in pellet form to obtain a more uniform distribution on the polymer pellets. Melt blending with the polymer is also operable.

The crosslinking step of the instant invention is carried out at temperatures above the softening point of the polymeric material. Temperatures up to 450° C. or even higher are operable so long as heat degradation of the polymer which is a function of temperature and time at temperature does not become a factor. For low density polyethylene, i.e. a density of 0.92, a preferable temperature range for the crosslinking step is 125–450° C. and for high density polyethylene (i.e. 0.96 density) a preferable range is 150–500° C. Obviously at the upper temperature limits the time at these temperatures is short, e.g. of the order of 10 seconds to 1½ minutes. At the lower crosslinking temperatures, curing may take from 10 minutes to 1 hour or more.

The polymer compositions to be cured in accord with the present invention may, if desired, include such additives as antioxidants, fillers, pigments, antistatic agents, extending oils, plasticizers, tactifiers and the like within the scope of this invention. Such additives are usually, but not necessarily, added to the polymer composition by pre-blending prior to or during the compounding step. Operable fillers include carbon black, clay, silica, alumina, carbonates, oxides, hydroxides, silicates, diatomaceous earth, talc, kaolin, barium sulfate, calcium sulfate, calcium carbonate and the like. The aforesaid additives may be present up to 200 parts or more per 100 parts of polymer by weight and preferably 0.001–100 parts on the same basis.

Operable copolymers containing 30% ethylene include ethylene propylene rubber, ethylene vinyl copolymers such as ethylene vinyl acetate, ethylene ethyl acrylate, and the like.

Operable free radical generating crosslinking agents in the instant invention include both azo compounds and organic peroxides. Examples of various organic peroxides which are operable include, but are not limited to, dicumyl peroxide; 2,5 - dimethyl - 2,5 - di(t-butylperoxy) hexane; 2,5 - dimethyl - 2,5 - di(t-butylperoxy)hexyne - 3; and ditertiary bisperoxides of the general formula

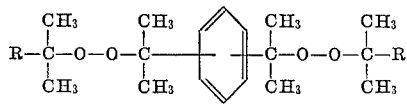

wherein R is a member of the group consisting of methyl and phenyl.

Operable azo compounds include but are not limited to 2 - phenyl-azo - 2,4,4 - trimethylvaleramide; 2 - phenylazoisobutyramide; 2 - phenylazo - 2,4,4 - trimethylvaleronitrile; 2 - phenylazo - 2,4,4 - trimethylvaleramide and the like.

The crosslinked polymeric products of the instant invention have many and varied uses. For example, the polymeric material can be extruded and crosslinked and used as film in the packaging industry. Additionally, various shapes can be molded from the crosslinked article and thereafter reheated to higher temperatures to crosslink same. Such shapes can include toys and various decorative articles such as statutes.

What is claimed is:

1. A composition useful in the production of crosslinked polymeric material consisting essentially of a member of the group consisting of ethylene homopolymers and ethylene copolymers wherein at least 30% of the copolymer is ethylene selected from the group consisting of ethylene propylene rubber, ethylene vinyl acetate and ethylene ethylacrylate, 0.001–10% by weight of said group member of a free radical generating crosslinking agent and 5–50% of an amount sufficient to react stoichiometrically with said free radical generating crosslinking agent of hydrogen sulfide.

2. The composition according to claim 1 where the free-radical generating crosslinking agent is an organic peroxide selected from the group consisting of dicumyl peroxide, 2,5 - dimethyl - 2,5 - di(t-butylperoxy)hexane; 2,5-dimethyl - 2,5 -di(t-butylperoxy)hexyne - 3 and ditertiary bisperoxides of the general formula

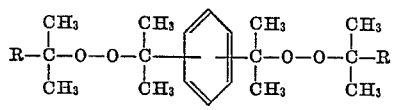

wherein R is a member of the group consisting of methyl and phenyl.

3. The process which comprises admixing a polymeric member of the group consisting of ethylene homopolymer and ethylene containing copolymers wherein at least 30% of the copolymer is ethylene selected from the group consisting of ethylene propylene rubber, ethylene vinyl acetate and ethylene ethylacrylate, 0.001–10% by weight of said group member of a free radical generating crosslinking agent and 5–50% of an amount sufficient to react stoichiometrically with said free radical generating crosslinking agent of hydrogen sulfide, heating said admixture to below the decomposition temperature of the free radical generating crosslinking agent but above the softening point of the polymeric group member to shape the polymeric admixture and thereafter heating the thus shaped article at a temperature sufficient to effect crosslinking of said polymeric group member.

4. The process according to claim 3 where the free radical generating crosslinking agent is an organic peroxide selected from the group consisting of dicumyl peroxide, 2,5 - dimethyl - 2,5 - di(t-butylperoxy)hexane; 2,5 - dimethyl - 2,5 - di(t-butylperoxy)hexyne - 3 and ditertiary bisperoxides of the general formula

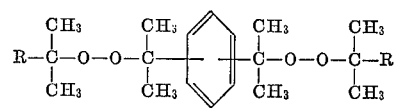

wherein R is a member of the group consisting of methyl and phenyl.

References Cited

UNITED STATES PATENTS

| | | | |
|---|---|---|---|
| 3,041,321 | 6/1962 | Youngman et al. | 260—88.2 |
| 3,171,824 | 3/1965 | Young | 260—27 |
| 3,265,670 | 8/1966 | Scott | 260—79 |
| 3,296,184 | 1/1967 | Portolani | 260—41 |
| 3,344,125 | 9/1967 | Gerritsen | 260—79.5 |
| 3,436,371 | 4/1969 | Ware | 260—46.5 |

OTHER REFERENCES

Ind. and Eng. Chem., L. Robinson et al., pp. 78–82.

JOSEPH L. SHOFER, Primary Examiner
S. M. LEVIN, Assistant Examiner

U.S. Cl. X.R.

260—41(R), (A), (B), (C), 87.3, 88.2(S), 94.9(GA)